(12) United States Patent
Zhu (10) Patent No.: US 10,715,820 B2
(45) Date of Patent: Jul. 14, 2020

(54) INTERFRAME PREDICTIVE CODING METHOD AND DEVICE

(71) Applicant: BEIJING QIYI CENTURY SCIENCE & TECHNOLOGY CO., LTD., Beijing (CN)

(72) Inventor: Hongbo Zhu, Beijing (CN)

(73) Assignee: BEIJING QIYI CENTURY SCIENCE & TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 16/313,601

(22) PCT Filed: Aug. 9, 2017

(86) PCT No.: PCT/CN2017/096641
§ 371 (c)(1),
(2) Date: Dec. 27, 2018

(87) PCT Pub. No.: WO2018/040869
PCT Pub. Date: Mar. 8, 2018

(65) Prior Publication Data
US 2019/0246119 A1    Aug. 8, 2019

(30) Foreign Application Priority Data
Aug. 30, 2016 (CN) .......................... 2016 1 0765403

(51) Int. Cl.
*H04N 19/176* (2014.01)
*H04N 19/503* (2014.01)
(Continued)

(52) U.S. Cl.
CPC ......... *H04N 19/176* (2014.11); *H04N 19/137* (2014.11); *H04N 19/46* (2014.11); *H04N 19/503* (2014.11); *H04N 19/577* (2014.11)

(58) Field of Classification Search
CPC .......................... H04N 19/176; H04N 19/503
See application file for complete search history.

(56) References Cited

U.S. PATENT DOCUMENTS

2005/0281334 A1    12/2005    Walker et al.
2006/0268166 A1    11/2006    Bossen et al.
(Continued)

FOREIGN PATENT DOCUMENTS

CN    106358041 A    1/1917
CN    1981535        6/2007
(Continued)

OTHER PUBLICATIONS

Chun-Chi Chen, Xiaoyu Xiu, Yuwen He, Yan Ye, Generalized bi-prediction for inter coding May 26-Jun. 1, 2016, Joint Video Exploration Team (JVET) (Year: 2016).*
(Continued)

Primary Examiner — Ayman A Abaza
Assistant Examiner — Hesham K Abouzahra
(74) Attorney, Agent, or Firm — Norton Rose Fulbright US LLP (57) ABSTRACT

An inter-frame predictive encoding method is disclosed and comprises: dividing a frame to be encoded into a plurality of block to be encoded by an encoder; determining, for each block to be encoded, a forward encoding block and a backward encoding block corresponding to the block to be encoded; determining a first weighting parameter corresponding to the forward encoding block; determining an overall brightness-based second weighting parameter of a reference image containing the forward encoding block, and determining an overall brightness-based third weighting parameter of a reference image containing the backward encoding block; determining a fourth weighting parameter corresponding to the backward encoding block according to
(Continued)

the first weighting parameter; determining a predictive actual weighting parameter of the block to be encoded according to the first, second, third, and fourth weighting parameters; performing predictive encoding on the block to be encoded by the predictive actual weighting parameter.

11 Claims, 2 Drawing Sheets

(51) Int. Cl.
*H04N 19/137* (2014.01)
*H04N 19/577* (2014.01)
*H04N 19/46* (2014.01)

(56) References Cited

U.S. PATENT DOCUMENTS

| | | | |
|---|---|---|---|
| 2007/0098074 A1 | 5/2007 | Kubota et al. | |
| 2011/0280309 A1* | 11/2011 | Francois | H04N 19/70 375/240.16 |
| 2012/0170665 A1 | 7/2012 | Demos | |
| 2012/0230392 A1* | 9/2012 | Zheng | H04N 19/197 375/240.02 |
| 2015/0208080 A1* | 7/2015 | Kim | H04N 19/463 375/240.15 |
| 2015/0237364 A1 | 8/2015 | Chujoh et al. | |

FOREIGN PATENT DOCUMENTS

| | | |
|---|---|---|
| CN | 101610413 A | 12/2009 |
| CN | 102301716 A | 12/2011 |
| CN | 103430540 A | 12/2013 |
| JP | 2009525687 | 7/2009 |
| JP | 2014511648 | 5/2014 |
| KR | 20110107829 | 10/2011 |

OTHER PUBLICATIONS

Bordes, Philippe, et al. "Weighted prediction for HEVC." Visual Information Processing and Communication III. vol. 8305., p. 830504, International Society for Optics and Photonics, Feb. 8, 2012.

Chen, et al. "Generalized bi-prediction for inter coding", JVET Meeting; May 26, 2016- Jun. 1, 2016, 1-4.

Extended Search Report issued in Corresponding European Patent Application No. 17845171.2 dated Jun. 11, 2019.

Fujibayashi, et al. "TE12: Performance of partition based illumination compensation (PBIC)", JCT-VC Meeting; Oct. 7, 2010-Oct. 15, 2010, 1-12.

Office Action issued in Corresponding Chinese Patent Application No. 201610765403.4, dated Nov. 22, 2018.

International Search Report for PCT/CN2017/096641 dated Oct. 10, 2017.

Office Action issued in Corresponding Taiwanese Patent Application No. 106128993, dated Aug. 14, 2018.

Office Action issued in corresponding Canadian Patent Application No. 3028510, dated Sep. 10, 2019.

Office Action issued in corresponding Japanese Application No. 2019-510423, dated Feb. 4, 2020 (English Translation provided).

Office Action issued in corresponding Korean Application No. 10-2018-7037514, dated Mar. 10, 2020 (English Translation provided).

* cited by examiner

INTERFRAME PREDICTIVE CODING METHOD AND DEVICE

The present application is a national phase application under 35 U.S.C. § 371 of International Application No. PCT/CN2017/096641 filed Aug. 9, 2017, which claims priority to Chinese patent application No. 201610765403.4, entitled "INTERFRAME PREDICTIVE CODING METHOD AND DEVICE" and filed with the Chinese Patent Office on Aug. 30, 2016. The entire contents of each of the above-referenced disclosures are specifically incorporated herein by reference in their entireties.

TECHNICAL FIELD

The present application relates to the field of video encoding technology, and in particular, to an inter-frame predictive encoding method and device.

BACKGROUND

It is well known that there is a strong correlation among video image data, that is, there is a lot of redundant information. Inter-frame predictive encoding is to predict a current block to be encoded in order to obtain a predictive value by means of a block in a reference image that has been encoded in time domain, and then encode the difference between the value of the block to be encoded and the predictive value. Inter-frame predictive encoding typically includes forward prediction, backward prediction, symmetric prediction, and bidirectional prediction. The forward prediction or the backward prediction only require one forward or backward reference frame, while the symmetric prediction and the bidirectional prediction require both forward frame and backward reference frame.

Generally, in the video encoding framework of modern block-based motion compensation hybrid DCT transform, a weighting parameter of the bidirectional weighting may be considered to be (½, ½), then a forward weighting parameter is (1, 0) and a backward weighting parameter is (0, 1). In H.264 bidirectional encoding, separate encoding is used. For a block to be encoded of a frame to be encoded, for example, if there are three encoding parameters which are ½, ⅓, ¼, the forward reference frame and the backward reference frame of the block to be encoded correspond to three weighting parameters respectively and the weighting parameters of the forward reference frame and the backward reference frame will be selected from 9 (3*3) modes. In actual prediction processes, there may be cases where both the forward weighting parameter and the backward weighting parameter are ⅓. Obviously, such weighting parameters are unreasonable, which may cause low accuracy of inter-frame predictive encoding.

SUMMARY OF THE INVENTION

It is an object of the present application to provide a bidirectional weighting predictive encoding method and device for improving accuracy of inter-frame predictive encoding.

To achieve the above object, an embodiment of the present application discloses an inter-frame predictive encoding method, which comprises the steps of:

dividing a frame to be encoded into a plurality of blocks to be encoded by means of an encoder;

determining, for each block to be encoded, a forward encoding block and a backward encoding block corresponding to the block to be encoded;

determining a first weighting parameter corresponding to the forward encoding block;

determining an overall brightness-based second weighting parameter of a reference image containing the forward encoding block, and determining an overall brightness-based third weighting parameter of a reference image containing the backward encoding block;

determining a fourth weighting parameter corresponding to the backward encoding block according to the first weighting parameter;

determining a predictive actual weighting parameter of the block to be encoded according to the first weighting parameter, the second weighting parameter, the third weighting parameter and the fourth weighting parameter;

performing predictive encoding on the block to be encoded by means of the predictive actual weighting parameter.

Optionally, the step of determining, for each block to be encoded, a forward encoding block and a backward encoding block corresponding to the block to be encoded comprises:

determining, for each block to be encoded, a forward encoding block and a backward encoding block corresponding to the block to be encoded through motion search technique.

Optionally, the step of determining the first weighting parameter corresponding to the forward encoding block comprises:

calculating a predictive block corresponding to each preset forward weighting parameter according to the forward encoding block and the backward encoding block;

calculating a residual value between the block to be encoded and each predictive block;

determining a forward weighting parameter corresponding to a residual value having the smallest absolute value as the first weighting parameter.

Optionally, the step of determining the overall brightness-based weighting parameters of a reference image comprises:

determining the overall brightness-based weighting parameter of the reference image according to the brightness values of all the pixels and the total number of pixels of the reference image.

Optionally, the reference image is a reference image containing the forward encoding block; the step of determining the overall brightness-based second weighting parameter of a reference image containing the forward encoding block comprises:

determining the overall brightness-based second weighting parameter of the reference image containing the forward encoding block according to the brightness values of all the pixels and the total number of pixels of the reference image containing the forward encoding block.

The reference image is a reference image containing the backward encoding block; the step of determining the overall brightness-based third weighting parameter of a reference image containing the backward encoding block comprises:

determining the overall brightness-based third weighting parameter of the reference image containing the backward encoding block according to the brightness values of all the pixels and the total number of pixels of the reference image containing the backward encoding block.

Optionally, the step of determining an overall brightness-based weighting parameter of a reference image comprises:

determining the overall brightness-based weighting parameter of the reference image according to the image to be encoded and the reference image through minimal residual technique.

Optionally, the reference image is a reference image containing the forward encoding block; the step of determining the overall brightness-based second weighting parameter of the reference image containing the forward encoding block comprise:

determining the overall brightness-based second weighting parameter of the reference image containing the forward encoding block according to the image to be encoded and the reference image containing the forward encoding block through minimal residual technique;

The reference image is a reference image containing the backward encoding block; the step of determining the overall brightness-based third weighting parameter of the reference image containing the backward encoding block comprises:

determining the overall brightness-based third weighting parameter of the reference image containing the backward encoding block according to the image to be encoded and the reference image containing the backward encoding block through minimal residual technique.

Optionally, the step of determining the fourth weighting parameter corresponding to the backward encoding block according to the first weighting parameter comprises:

determining the fourth weighting parameter corresponding to the backward encoding block according to the first weighting parameter and the following formula: fourth weighting parameter=1−first weighting parameter.

To achieve the above object, an embodiment of the present application discloses an inter-frame predictive encoding device, which comprises a processor and a memory, the processor is configured to execute the following program modules stored in the memory:

a division module for dividing a frame to be encoded into a plurality of blocks to be encoded by means of an encoder;

a first determination module for determining, for each block to be encoded, a forward encoding block and a backward encoding block corresponding to the block to be encoded;

a second determination module for determining a first weighting parameter corresponding to the forward encoding block;

a third determination module for determining an overall brightness-based second weighting parameter of a reference image containing the forward encoding block, and determining an overall brightness-based third weighting parameter of a reference image containing the backward encoding block;

a fourth determination module for determining a fourth weighting parameter corresponding to the backward encoding block according to the first weighting parameter;

a fifth determination module for determining a predictive actual weighting parameter of the block to be encoded according to the first weighting parameter, the second weighting parameter, the third weighting parameter and the fourth weighting parameter;

an encoding module for performing predictive encoding on the block to be encoded by means of the predictive actual weighting parameter.

Optionally, the first determination module, is specifically used for determining, for each block to be encoded, a forward encoding block and a backward encoding block corresponding to the block to be encoded through motion search technique.

Optionally, the second determination module comprises: a first calculation sub-module, a second calculation sub-module, and a determination sub-module, wherein the first calculation sub-module is used for calculating a predictive block corresponding to each preset forward weighting parameter according to the forward encoding block and the backward encoding block;

the second calculation sub-module is used for calculating a residual value between the block to be encoded and each predictive block;

the determination sub-module is used for determining a forward weighting parameter corresponding to a residual value having the smallest absolute value as the first weighting parameter.

Optionally, the fourth determination module is specifically used for:

determining the fourth weighting parameter corresponding to the backward encoding block according to the first weighting parameter and the following formula: fourth weighting parameter=1−first weighting parameter.

In another aspect of the present application, there is provided an electronic device comprising a processor, a communication interface, a memory and a communication bus, wherein the processor, the communication interface, and the memory communicate with each other via the communication bus;

the memory is provided for storing computer programs;

the processor is provided for executing the programs stored on the memory to perform any one of the inter-frame predictive encoding methods as described above.

In still another aspect of the present application, there is further provided a computer-readable storage medium having instructions stored therein. When the instructions are executed on a computer, the computer performs any one of the inter-frame predictive encoding methods as described above.

In yet another aspect of the present application, there is further provided a computer program product containing instructions according to embodiments of the present invention. When the instructions are executed on a computer, the computer performs any one of the inter-frame predictive encoding methods as described above.

As can be seen from the aforementioned technical solution, the embodiments of the present application provide an inter-frame predictive encoding method and device, wherein the method comprises: dividing a frame to be encoded into a plurality of blocks to be encoded by means of an encoder; determining, for each block to be encoded, a forward encoding block and a backward encoding block corresponding to the block to be encoded; determining a first weighting parameter corresponding to the forward encoding block; determining an overall brightness-based second weighting parameter of a reference image containing the forward encoding block, and determining an overall brightness-based third weighting parameter of a reference image containing the backward encoding block; determining a fourth weighting parameter corresponding to the backward encoding block according to the first weighting parameter; determining a predictive actual weighting parameter of the block to be encoded according to the first weighting parameter, the second weighting parameter, the third weighting parameter and the fourth weighting parameter; performing predictive encoding on the block to be encoded by means of the predictive actual weighting parameter.

According to the technical solution provided by the embodiments of the present application, the backward weighting parameter corresponding to the backward encoding block is determined by the forward weighting parameter of the forward encoding block without selecting the backward weighting parameter from the weighting parameters, which thereby avoids the problem of lower accuracy of the predictive encoding resulted from the irrational selection of a backward weighting parameter from the weighting parameters in prior art. Therefore, accuracy of the inter-frame predictive encoding is improved.

Of course, any method or device for implementing the present application does not necessarily have all of the advantages described above.

BRIEF DESCRIPTION OF THE DRAWINGS

In order to more clearly illustrate the technical solutions of the present application or the prior art, the following drawings, which are to be used in the description of the embodiments or the prior art, are briefly described below.

DETAILED DESCRIPTION OF THE INVENTION

The technical solution of the embodiments of the present application will be described below with reference to the drawings in the embodiments of the present application.

In order to solve the problems of the prior art, the embodiment of the present application provides an inter-frame predictive encoding method and device, which will be described in detail below.

It should be noted that an encoder divides an image to be encoded into basic encoding units having a maximum size of 64*64 that do not overlap with each other, and encodes each of the basic encoding units in order from top to bottom, from left to right. In practice, the basic encoding unit can be directly encoded as an encoding unit. The basic encoding unit can also be divided into an encoding unit according to a quad-tree, and the encoding unit can be further divided into encoding blocks.

The inter-frame predictive encoding method and the device provided by the embodiment of the present application are mainly for both symmetric prediction and bidirectional prediction. A current frame to be encoded contains a forward reference frame list and a backward reference frame list, and a reference frame list contains a plurality of reference frames. For each block to be encoded, search a forward encoding block and a backward encoding block; select the optimal weighting parameter for encoding according to a preset weighting parameter; when the reference image has a brightness change, it is also necessary to perform weighting prediction according to brightness change value.

Figure 1:
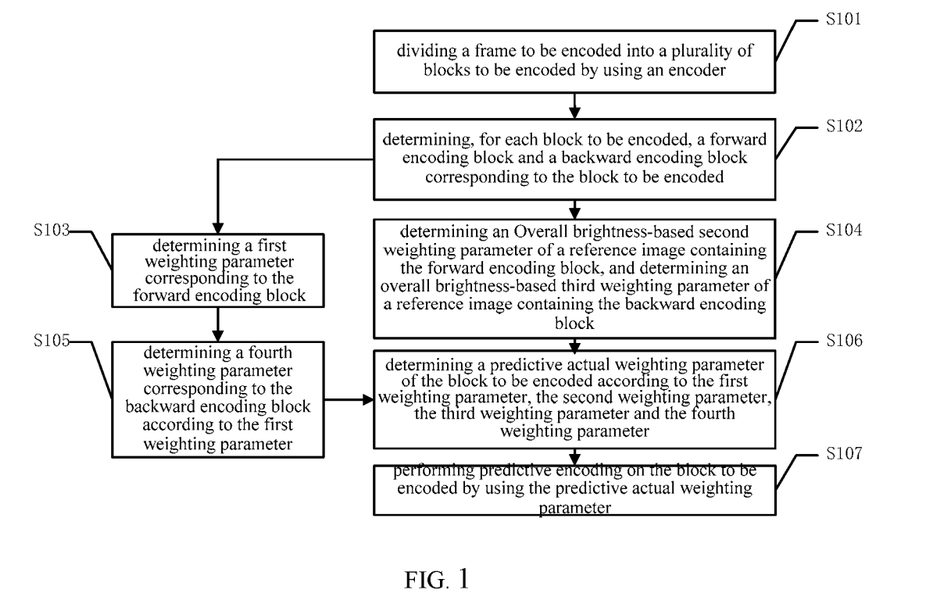
FIG. 1 is a flow chart of an inter-frame predictive encoding method according to an embodiment of the present application.

FIG. 1 is a flow chart of an inter-frame predictive encoding method according to an embodiment of the present application, which comprises the following steps of:

S101, dividing a frame to be encoded into a plurality of blocks to be encoded by means of an encoder.

It should be noted that the step of dividing the frame to be encoded into a plurality of blocks to be encoded may comprise sequentially reading the block to be encoded in the order of encoding, wherein the size of the block to be encoded read each time may be preset, and the size may be, for example, 8*8, 8*16, 16*8, etc.

S102, determining, for each block to be encoded, a forward encoding block and a backward encoding block corresponding to the block to be encoded.

Specifically, the step of determining, for each block to be encoded, a forward encoding block and a backward encoding block corresponding to the block to be encoded may comprise determining, for each block to be encoded, a forward encoding block and a backward encoding block corresponding to the block to be encoded through motion search technique.

That is, for each block to be encoded, the motion search technique may be used to search for a block that is the most similar to the block to be encoded, i.e., a matching block, from a forward reference frame list and a backward reference frame list, then the forward encoding block and backward encoding block can be obtained.

S103, determining a first weighting parameter corresponding to the forward encoding block.

Specifically, the step of determining the first weighting parameter corresponding to the forward encoding block may comprise: calculating a predictive block corresponding to each preset forward weighting parameter according to the forward encoding block and the backward encoding block; calculating a residual value between the block to be encoded and each predictive block; determining a forward weighting parameter corresponding to a residual value having the smallest absolute value as the first weighting parameter.

As an example, the preset forward weighting parameters of the encoder are ⅓, ⅔, ¼, ½, ¾, the forward encoding block and backward encoding block of the block to be encoded $L_0$ are $L_1$ and $L_2$ respectively. Take the predictive block $K_1$ corresponding to the weighting parameter ⅓ as an example, $K_1 = ⅓ L_1 + (1 - ⅓) L_2$, and then calculate $K_2$, $K_3$, $K_4$, $K_5$ successively. Assume that the residual values obtained by subtracting the calculated five predictive blocks from the block to be encoded $L_0$ are $P_1 = 0.15$, $P_2 = 0.12$, $P_3 = 0.11$, $P_4 = 0.03$, $P_5 = -0.005$, respectively, wherein a residual value having the minimum absolute value is $-0.005$ which corresponds to $K_5$, then ¾ is determined as the first weighting parameter.

In another embodiment, obtaining the forward weighting parameter may comprise: setting a parameter N; dividing (0, 1) into N parts, namely 0, 1/N, 2/N N/N, which are then determined as the forward weighting parameters. Assuming that N=4, then the specific forward weighting parameters are 0, ¼, ½, ¾, 1. It is also possible to bind the frame to be encoded including the block to be encoded with the forward reference frame including forward encoding block and the backward reference frame including backward encoding block; if the frame to be encoded still corresponds to the forward reference frame and the backward reference frame when performing the next encoding, obtaining the forward weighting parameter by means of N directly.

In general, for example, N may be preset; alternatively, N may be obtained by iterating each block in the frame to be encoded with the forward reference frame and the backward reference frame for a plurality of times. Generally, the value of N is greater than 3, but considering the impact on encoding efficiency, the value of N is generally not greater than 10. N may be recorded in the frame header of the frame to be encoded or in the encoding parameter combination.

S104, determining an overall brightness-based second weighting parameter of a reference image containing the forward encoding block, and determining an overall brightness-based third weighting parameter of a reference image containing the backward encoding block.

In an implementation, the step of determining an overall brightness-based weighting parameter of a reference image may comprise determining the overall brightness-based weighting parameter of the reference image according to the brightness values of all the pixels and the total number of pixels of the reference image.

The step of determining the overall brightness-based second weighting parameter of a reference image containing the forward encoding block may comprise determining the overall brightness-based second weighting parameter of the reference image containing the forward encoding block according to the brightness values of all the pixels and the total number of pixels of the reference image containing the forward encoding block.

The step of determining the overall brightness-based third weighting parameter of the reference image containing the backward encoding block may comprise determining the overall brightness-based third weighting parameter of the reference image containing the backward encoding block according to the brightness values of all the pixels and the total number of pixels of the reference image containing the backward encoding block.

When there is a change in the light intensity of the reference image containing the forward encoding block and the backward encoding block, in order to ensure the accuracy of inter-frame predictive encoding, it is generally necessary to encode the brightness values of the reference image. Therefore, it is necessary to calculate the weighting parameter for the overall brightness of the reference image. In practice, the brightness values of the reference image may be added up to obtain the sum of the brightness values, then the brightness weighting parameter is obtained by dividing the sum of the brightness values by the number of pixels. For example, if the number of pixels of the reference image containing the forward encoding block is 10 and the sum of the brightness values of 10 pixels is 11, the brightness weighting parameter is 11/10, i.e., 1.1.

In another embodiment, the step of determining the overall brightness-based weighting parameter of the reference image may comprise determining the overall brightness-based weighting parameter of the reference image according to the image to be encoded and the reference image through minimal residual technique.

The step of determining the overall brightness-based second weighting parameter of the reference image containing the forward encoding block may comprise determining the overall brightness-based second weighting parameter of the reference image containing the forward encoding block according to the image to be encoded and the reference image containing the forward encoding block through minimal residual technique.

The step of determining the overall brightness-based third weighting parameter of the reference image containing the backward encoding block may comprise determining the overall brightness-based third weighting parameter of the reference image containing the backward encoding block according to the image to be encoded and the reference image containing the backward encoding block through minimal residual technique.

Specifically, the frame to be encoded and the two reference images containing forward encoding blocks and backward encoding blocks respectively, may be down-sampled to smaller images, a brightness weighting parameter is selected and multiplied with a reference image to obtain a weighting reference image, and the aforementioned smaller images are divided into blocks, then, for each block of a current image, a matching block in the weighting reference image is searched for each small block obtained by dividing to obtain prediction residual values, thereby obtaining the sum of their squares; the sum of squares of the corresponding residual values is obtained by transforming the different brightness weighting parameters. The brightness weighting parameter corresponding to the minimal sum of squares of residual values is selected as the brightness weighting parameter of the reference image. Accordingly, the second and third overall brightness-based weighting parameters of the reference images containing the forward encoding block and the backward encoding block may be expressed as $W_1$, $W_2$.

S105, determining a fourth weighting parameter corresponding to the backward encoding block according to the first weighting parameter.

Specifically, the step of determining the fourth weighting parameter corresponding to the backward encoding block may comprise determining the fourth weighting parameter corresponding to the backward encoding according to the first weighting parameter and the following formula: fourth weighting parameter=1–first weighting parameter. It will be understood by those skilled in the art that, for example, the first weighting parameter corresponding to the forward encoding block is determined to be ¾ in S103, and then the second weighting parameter corresponding to the backward encoding block is 1–¾=¼.

For another example, in the case where the first weighting parameters are 0, ¼, ½, ¾, 1 respectively, the corresponding fourth weighting parameters are: 1, ¾, ½, ¼, 0. The first weighting parameters and the corresponding fourth weighting parameters are expressed in the form of a combination, namely, (0, 1), (¼, ¾), (½, ½), (¾, ¼), (1, 0). When the combination of the first weighting parameter and the corresponding fourth weighting parameter is (0, 1), since the first weighting parameter is 0, then in this case it indicates backward prediction. Similarly, when the combination of the first weighting parameter and the corresponding fourth weighting parameter is (1, 0), since the fourth weighting parameter is 0, then in this case it indicates forward prediction.

S106, determining a predictive actual weighting parameter of the block to be encoded according to the first weighting parameter, the second weighting parameter, the third weighting parameter and the fourth weighting parameter.

In practice, the reference image containing the forward encoding blocks and the backward encoding blocks typically has change in light intensity, therefore the encoding of the block to be encoded is not only related to the weighting parameters but also to the brightness of the reference image. The aforementioned predictive actual weighting parameter can generally be expressed as (the first weighting parameter*the second weighting parameter, the third weighting parameter*the fourth weighting parameter). For example, if the first weighting parameter is ¾ and the fourth weighting parameter is ¼, then the predictive actual weighting parameter is (¾ *$W_1$, ¼ *$W_2$). If $W_1$=1.1 and $W_2$=1.2, the predictive actual weighting parameter is (0.825, 0.3). When there is no change in light intensity in the reference image containing the forward encoding blocks and the backward encoding blocks, W1 and W2 are equal to 1 and the predictive actual weighting parameter may be expressed as (the first weighting parameter, the fourth weighting parameter).

S107, performing predictive encoding on the block to be encoded by means of the predictive actual weighting parameter.

After the aforementioned predictive actual weighting parameter is obtained, the predictive actual weighting parameter, for example, (0.825, 0.3), can be combined with the forward encoding block and the backward encoding block to obtain the residual value between the predictive block and the block to be encoded, then the predictive encoding is performed on the residual value.

It will be understood by those skilled in the art that the frame to be encoded is first divided into basic encoding units. For each of the basic encoding units in the encoding order from top to bottom, from left to right, the following steps are performed: divide the basic encoding unit into four encoding units by means of a quad-tree, divide the four encoding units independently to obtain encoding blocks of a size of 8*8, of 8*16, of 16*8, or of 16*16. In the embodiments of the present application, the size of the encoding block is not restricted as long as the encoding block can satisfy the encoding requirement.

It can be seen that according to the embodiment of FIG. 1 of the present application, the backward weighting parameter corresponding to the backward encoding block is determined according to the forward weighting parameter of the forward encoding block without selecting the backward weighting parameter from the weighting parameters, which thereby avoids the problem of lower accuracy of the predictive encoding resulted from the irrational selection of a backward weighting parameter from the weighting parameters in prior art. Therefore, the accuracy of the inter-frame predictive encoding is improved.

It should be noted that the execution order of the aforementioned steps S103 and S104 is not strictly restricted, that is, after the step S102 is performed, either the step S103 or step S104 may be performed first, or step S103 and step S104 may be performed synchronously. Further, after the execution of step S103 is completed, the first weighting parameter is obtained, and then step S105 can be performed. After step S105 and step S104 are completed, step S106 can be performed.

Figure 2:
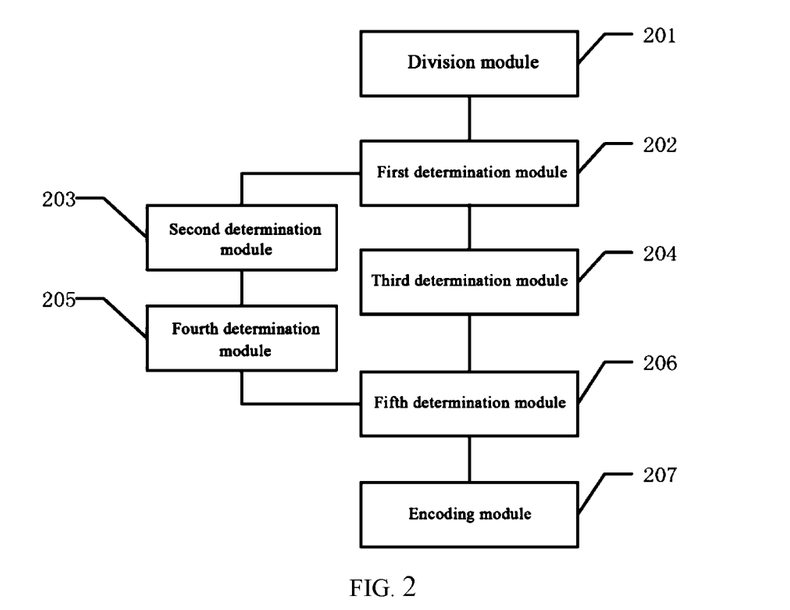
FIG. 2 is a schematic structural diagram of an inter-frame predictive encoding device according to an embodiment of the present application.

FIG. 2 is a schematic structural diagram of an inter-frame predictive encoding device according to an embodiment of the present application, which may comprise: a division module 201, a first determination module 202, a second determination module 203, a third determination module 204, a fourth determination module 205, a fifth determination module 206 and an encoding module 207, a processor and a memory, the processor is configured to execute the described program modules stored in the memory.

The division module 201 is used for dividing a frame to be encoded into a plurality of blocks to be encoded by means of an encoder.

The first determination module 202 is used for determining, for each block to be encoded, a forward encoding block and a backward encoding block corresponding to the block to be encoded.

Specifically, in practice, the first determination module 202 is specifically used for determining, for each block to be encoded, a forward encoding block and a backward encoding block corresponding to the block to be encoded through motion search technique.

The second determination module 203 is used for determining a first weighting parameter corresponding to the forward encoding block.

Specifically, in practice, the second determination module 203 may include a first calculation sub-module, a second calculation sub-module, a determination sub-module (not shown), wherein, the first calculation sub-module is used for calculating a predictive block corresponding to each preset forward weighting parameter according to the forward encoding block and the backward encoding block;

the second calculation sub-module is used for calculating a residual value between the block to be encoded and each predictive block;

the determination sub-module is used for determining a forward weighting parameter corresponding to a residual value having the smallest absolute value as the first weighting parameter.

The third determination module 204 is used for determining an overall brightness-based second weighting parameter of a reference image containing the forward encoding block, and determining an overall brightness-based third weighting parameter of a reference image containing the backward encoding block.

The fourth determination module 205 is used for determining a fourth weighting parameter corresponding to the backward encoding block according to the first weighting parameter.

Specifically, in practice, the fourth deterministic module 205 may be used for determining the fourth weighting parameter corresponding to the backward encoding block according to the first weighting parameter and the following formula: fourth weighting parameter=1−first weighting parameter.

The fifth determination module 206 is used for determining a predictive actual weighting parameter of the block to be encoded according to the first weighting parameter, the second weighting parameter, the third weighting parameter and the fourth weighting parameter.

The encoding module 207 is used for performing predictive encoding on the block to be encoded by means of the predictive actual weighting parameter.

It can be seen that according to the embodiment of FIG. 2 of the present application, the backward weighting parameter corresponding to the backward encoding block is determined according to the forward weighting parameter of the forward encoding block without selecting the backward weighting parameter from the weighting parameters, which thereby avoids the problem of lower accuracy of the predictive encoding resulted from the irrational selection of a backward weighting parameter from the weighting parameters in prior art. Therefore, the accuracy of the inter-frame predictive encoding is improved.

Figure 3:
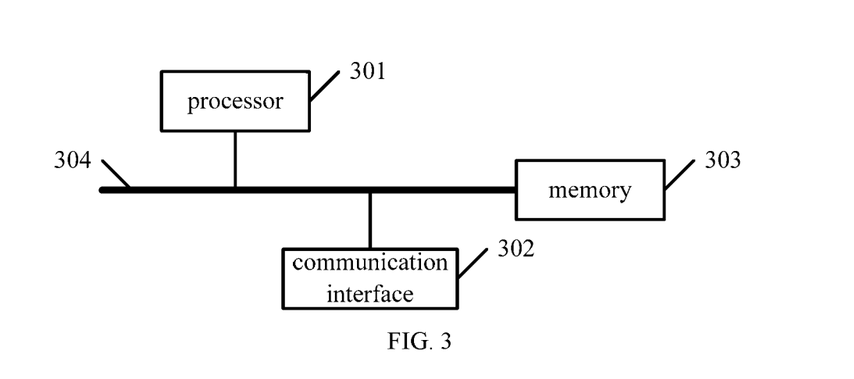
FIG. 3 is a schematic structural diagram of an electronic device according to an embodiment of the present application.

As shown in FIG. 3, the embodiment of the present invention also provides an electronic device, which comprises a processor 301, a communication interface 302, a memory 303 and a communication bus 304, wherein the processor 301, the communication interface 302, and the memory 303 communicate with each other via the communication bus 304, the memory 303 is used to store computer programs;

when the processor 301 is used to execute the programs stored on the memory 303, the following steps will be performed:

dividing a frame to be encoded into a plurality of blocks to be encoded by means of an encoder;

determining, for each block to be encoded, a forward encoding block and a backward encoding block corresponding to the block to be encoded;

determining a first weighting parameter corresponding to the forward encoding block;

determining an overall brightness-based second weighting parameter of a reference image containing the forward encoding block, and determining an overall brightness-based third weighting parameter of a reference image containing the backward encoding block;

determining a fourth weighting parameter corresponding to the backward encoding block according to the first weighting parameter;

determining a predictive actual weighting parameter of the block to be encoded according to the first weighting parameter, the second weighting parameter, the third weighting parameter and the fourth weighting parameter;

performing predictive encoding on the block to be encoded by means of the predictive actual weighting parameter.

The communication bus aforementioned in the electronic device may be a peripheral component interconnect (PCI) bus or an extended industry standard architecture (EISA) bus, etc. The communication bus may include an address bus, a data bus, a control bus, etc. For representation, only one thick line is shown in FIG. 3, which does not mean there is only one bus or one type of bus.

The communication interface is used for communication between the aforementioned electronic device and other devices.

The memory may include a random access memory (RAM), or may include non-volatile memory (NVM), for example at least one disk memory. Optionally, the memory may also be at least one storage device located away from the aforementioned processor.

The aforementioned processor may be a general-purpose processor, such as a central processing unit (CPU), a network processor (NP), etc.; it may also be a digital signal processor (DSP), an application specific integrated circuit (ASIC), a field-programmable gate array (FPGA) or other programmable logic device, a discrete gate or transistor logic device, a discrete hardware component.

It can be seen that in the scheme provided by the embodiment of the present application, the electronic device determines a backward weighting parameter corresponding to a backward encoding block based on a forward weighting parameter of a forward encoding block without selecting a backward weighting parameter from weighting parameters, thereby avoiding the problem of lower accuracy of the predictive encoding resulted from the irrational selection of a backward weighting parameter from the weighting parameters in prior art. Therefore, the accuracy of the inter-frame predictive encoding is improved.

The step of determining, for each block to be encoded, a forward encoding block and a backward encoding block corresponding to the block to be encoded may comprise the step of:

determining, for each block to be encoded, a forward encoding block and a backward encoding block corresponding to the block to be encoded through motion search technique.

The step of determining a first weighting parameter corresponding to the forward encoding block may comprise the steps of:

calculating a predictive block corresponding to each preset forward weighting parameter according to the forward encoding block and the backward encoding block;

calculating a residual value between the block to be encoded and each predictive block;

determining a forward weighting parameter corresponding to a residual value having the smallest absolute value as the first weighting parameter.

Wherein the step of determining an overall brightness based weighting parameter of a reference image may comprise:

determining an overall brightness-based weighting parameter of the reference image according to the brightness values of all the pixels and the total number of pixels of the reference image.

The reference image is a reference image containing the forward encoding block; the step of determining the overall brightness-based second weighting parameter of a reference image containing the forward encoding block comprises the step of:

determining the overall brightness-based second weighting parameter of the reference image containing the forward encoding block according to the brightness values of all the pixels and the total number of pixels of the reference image containing the forward encoding block.

The reference image is a reference image containing the backward encoding block; the step of determining the overall brightness-based third weighting parameter of a reference image containing the backward encoding block comprises the step of:

determining the overall brightness-based third weighting parameter of the reference image containing the backward encoding block according to the brightness values of all the pixels and the total number of pixels of the reference image containing the backward encoding block.

Wherein the step of determining the weighting parameters of a reference image may comprise the step of:

determining the overall brightness-based weighting parameter of the reference image according to the image to be encoded and the reference image through minimal residual technique.

The reference image is a reference image containing the forward encoding block; the step of determining the overall brightness-based second weighting parameter of a reference image containing the forward encoding block comprises the step of:

determining the overall brightness-based second weighting parameter of the reference image containing the forward encoding block according to the image to be encoded and the reference image containing the forward encoding block through minimal residual technique.

The reference image is a reference image containing the backward encoding block; the step of determining the overall brightness-based third weighting parameter of a reference image containing the backward encoding block comprises the step of:

determining the overall brightness-based third weighting parameter of the reference image containing the backward encoding block according to the image to be encoded and the reference image containing the backward encoding block through minimal residual technique.

The step of determining the fourth weighting parameter corresponding to the backward encoding block according to the first weighting parameter may comprise the step of:

determining the fourth weighting parameter corresponding to the backward encoding block according to the first weighting parameter and the following formula: fourth weighting parameter=1−first weighting parameter.

In yet another embodiment according to the present invention, there is also provided a computer-readable storage medium which stores instructions that, when running on a computer, cause the computer to perform the inter-frame predictive encoding method described in any one of the embodiments described above.

The inter-frame predictive encoding method may include the following steps of:

dividing a frame to be encoded into a plurality of blocks to be encoded by means of an encoder;

determining, for each block to be encoded, a forward encoding block and a backward encoding block corresponding to the block to be encoded;

determining a first weighting parameter corresponding to the forward encoding block;

determining an overall brightness-based second weighting parameter of a reference image containing the forward encoding block, and determining an overall brightness-based third weighting parameter of a reference image containing the backward encoding block;

determining a fourth weighting parameter corresponding to the backward encoding block according to the first weighting parameter;

determining a predictive actual weighting parameter of the block to be encoded according to the first weighting parameter, the second weighting parameter, the third weighting parameter and the fourth weighting parameter;

performing predictive encoding on the block to be encoded by means of the predictive actual weighting parameter.

It can be seen that in the scheme provided by the embodiment of the present application, the backward weighting parameter corresponding to the backward encoding block is determined according to the forward weighting parameter of the forward encoding block without selecting the backward weighting parameter from the weighting parameters, thereby avoiding the problem of lower accuracy of the predictive encoding resulted from the irrational selection of a backward weighting parameter from the weighting parameters in prior art. Therefore, the accuracy of the inter-frame predictive encoding is improved.

The step of determining, for each block to be encoded, a forward encoding block and a backward encoding block corresponding to the block to be encoded may comprise the step of:

determining, for each block to be encoded, the forward encoding block and the backward encoding block corresponding to the block to be encoded through motion search technique.

The step of determining the first weighting parameter corresponding to the forward encoding block may comprise the steps of:

calculating a predictive block corresponding to each preset forward weighting parameter according to the forward encoding block and the backward encoding block;

calculating a residual value between the block to be encoded and each predictive block;

determining a forward weighting parameter corresponding to a residual value having the smallest absolute value as the first weighting parameter.

Wherein the step of determining the overall brightness-based weighting parameter of a reference image may comprise the step of:

determining the overall brightness-based weighting parameter of the reference image according to the brightness values of all the pixels and the total number of pixels of the reference image.

The reference image is a reference image containing the forward encoding block; the step of determining the overall brightness-based second weighting parameter of a reference image containing the forward encoding block comprises the step of:

determining the overall brightness-based second weighting parameter of the reference image containing the forward encoding block according to the brightness values of all the pixels and the total number of pixels of the reference image containing the forward encoding block.

The reference image is a reference image containing the backward encoding block; the step of determining the overall brightness-based third weighting parameter of a reference image containing the backward encoding block comprises the step of:

determining the overall brightness-based third weighting parameter of the reference image containing the backward encoding block according to the brightness values of all the pixels and the total number of pixels of the reference image containing the backward encoding block.

Wherein the step of determining the overall brightness-based weighting parameters of a reference image may comprise the step of:

determining the overall brightness-based weighting parameter of the reference image according to the image to be encoded and the reference image through minimal residual technique.

The reference image is a reference image containing the forward encoding block; the step of determining the overall brightness-based second weighting parameter of a reference image containing the forward encoding block comprises the step of:

determining the overall brightness-based second weighting parameter of the reference image containing the forward encoding block according to the image to be encoded and the reference image containing the forward encoding block through minimal residual technique.

The reference image is a reference image containing the backward encoding block; the step of determining the overall brightness-based third weighting parameter of a reference image containing the backward encoding block comprises the step of:

determining the overall brightness-based third weighting parameter of the reference image containing the backward encoding block according to the image to be encoded and the reference image containing the backward encoding block through minimal residual technique.

The step of determining the fourth weighting parameter corresponding to the backward encoding block according to the first weighting parameter may comprise the step of:

determining the fourth weighting parameter corresponding to the backward encoding block according to the first weighting parameter and the following formula: fourth weighting parameter=1−first weighting parameter.

In still another embodiment according to the present invention, there is also provided a computer program product containing instructions that, when running on a computer, cause the computer to perform the inter-frame predictive encoding method described in any one of the embodiments described above.

The inter-frame predictive encoding method may include the steps of:

dividing a frame to be encoded into a plurality of blocks to be encoded by means of an encoder;

determining, for each block to be encoded, a forward encoding block and a backward encoding block corresponding to the block to be encoded;

determining a first weighting parameter corresponding to the forward encoding block;

determining an overall brightness-based second weighting parameter of a reference image containing the forward encoding block, and determining an overall brightness-based third weighting parameter of a reference image containing the backward encoding block;

determining a fourth weighting parameter corresponding to the backward encoding block according to the first weighting parameter;

determining a predictive actual weighting parameter of the block to be encoded according to the first weighting parameter, the second weighting parameter, the third weighting parameter and the fourth weighting parameter;

performing predictive encoding on the block to be encoded by means of the predictive actual weighting parameter.

It can be seen that in the scheme provided by the embodiment of the present application, the backward weighting parameter corresponding to the backward encoding block is determined according to the forward weighting parameter of the forward encoding block without selecting the backward weighting parameter from the weighting parameters, thereby avoiding the problem of lower accuracy of the predictive encoding resulted from the irrational selection of a backward weighting parameter from the weighting parameters in prior art. Therefore, the accuracy of the inter-frame predictive encoding is improved.

The step of determining, for each block to be encoded, a forward encoding block and a backward encoding block corresponding to the block to be encoded may comprise the step of:

determining, for each block to be encoded, a forward encoding block and a backward encoding block corresponding to the block to be encoded through motion search technique.

The step of determining the first weighting parameter corresponding to the forward encoding block may comprise the steps of:

calculating a predictive block corresponding to each preset forward weighting parameter according to the forward encoding block and the backward encoding block;

calculating a residual value between the block to be encoded and each predictive block;

determining a forward weighting parameter corresponding to a residual value having the smallest absolute value as the first weighting parameter.

Wherein the step of determining the overall brightness-based weighting parameters of a reference image may comprise the step of:

determining the overall brightness-based weighting parameter of the reference image according to the brightness values of all the pixels and the total number of pixels of the reference image.

The reference image is a reference image containing the forward encoding block; the step of determining the overall brightness-based second weighting parameter of a reference image containing the forward encoding block comprises the step of:

determining the overall brightness-based second weighting parameter of the reference image containing the forward encoding block according to the brightness values of all the pixels and the total number of pixels of the reference image containing the forward encoding block.

The reference image is a reference image containing the backward encoding block; the step of determining the overall brightness-based third weighting parameter of a reference image containing the backward encoding block comprises the step of:

determining the overall brightness-based third weighting parameter of the reference image containing the backward encoding block according to the brightness values of all the pixels and the total number of pixels of the reference image containing the backward encoding block.

Wherein the step of determining the overall brightness-based weighting parameters of a reference image may comprise the step of:

determining the overall brightness-based weighting parameter of the reference image according to the image to be encoded and the reference image through minimal residual technique.

The reference image is a reference image containing the forward encoding block; the step of determining the overall brightness-based second weighting parameter of a reference image containing the forward encoding block comprises the step of:

determining the overall brightness-based second weighting parameter of the reference image containing the forward encoding block according to the image to be encoded and the reference image containing the forward encoding block through minimal residual technique.

The reference image is a reference image containing the backward encoding block; the step of determining the overall brightness-based third weighting parameter of a reference image containing the backward encoding block comprises the step of:

determining the overall brightness-based third weighting parameter of the reference image containing the backward encoding block according to the image to be encoded and the reference image containing the backward encoding block through minimal residual technique.

The step of determining the fourth weighting parameter corresponding to the backward encoding block according to the first weighting parameter may comprise the step of:

determining the fourth weighting parameter corresponding to the backward encoding block according to the first weighting parameter and the following formula: fourth weighting parameter=1−first weighting parameter.

In the aforementioned embodiments, it may be implemented in whole or in part by software, hardware, firmware, or any combination thereof. When implemented by software, it may be implemented in whole or in part in the form of a computer program product. The computer program product includes one or more computer instructions. The processes or functions described in accordance with the embodiments of the present invention are produced in whole or in part, when the computer program instructions are loaded and executed on a computer. The computer may be a general-purpose computer, a dedicated computer, a computer network, or other programmable device. The computer instructions may be stored in a computer-readable storage medium or may be transmitted from one computer-readable storage medium to another computer-readable storage medium, for example, the computer instructions may be transmitted from a web site, a computer, a server, or a data center to another web site, another computer, another server, or another data center via a cable (such as a coaxial cable, an optical fiber, a digital subscriber line (DSL)) or wireless (such as infrared, wireless, microwave, etc.). The computer-readable storage medium may be any available medium that may be accessed by a computer or a data storage device such as a server or a data center containing one or more available medium integrations. The available media may be magnetic media (such as floppy disks, hard disks, magnetic tapes), optical media (such as DVDs), or semiconductor media (such as solid state disk (SSD)), etc.

It should be noted that, the relationship terms herein such as "first", "second" and the like are only used to distinguish one entity or operation from another entity or operation, but do not necessarily require or imply that there is actual relationship or order between these entities or operations. Moreover, the terms "include", "comprise" or any other variants thereof are intended to cover a non-exclusive inclusion, such that processes, methods, articles, or devices comprising a series of elements comprise not only those elements listed but also those not specifically listed or the elements intrinsic to these processes, methods, articles, or equipment. Without further limitations, elements defined by the sentences "comprise(s) a . . . " or "include(s) a . . . " do not exclude that there are other identical elements in the processes, methods, articles, or devices which comprise these elements.

Various embodiments of the description adopt corresponding ways to describe, and same or similar parts in various embodiments can be referred to one another, each embodiment is focused on the differences from other embodiments. Especially for embodiments of a device, since they are similar to embodiments of a method, the description thereof is relatively simple; the relating parts could refer to the parts of the description of embodiments of the method.

It will be understood by those of ordinary skill in the art that all or some of the steps in the method described above may be accomplished by a program to instruct the associated hardware. The program may be stored in a computer-readable storage medium, such as ROM/RAM, magnetic disks, optical disks, etc. Embodiments described above are just preferred embodiments of the present invention, and not intended to limit the scope of the present invention. Any modifications, equivalent, improvement or the like within the spirit and principle of the present invention should be included in the scope of the present invention.

The invention claimed is:

1. An inter-frame predictive encoding method, wherein the method comprises:
   dividing a frame to be encoded into a plurality of blocks to be encoded;
   determining, for each block to be encoded, a forward encoding block and a backward encoding block corresponding to the block to be encoded;
   determining a first weighting parameter corresponding to the forward encoding block;
   determining a fourth weighting parameter corresponding to the backward encoding block according to the first weighting parameter and the following formula: fourth weighting parameter=1−first weighting parameter;
   determining an overall brightness-based second weighting parameter of a reference image containing the forward encoding block, and determining an overall brightness-based third weighting parameter of a reference image containing the backward encoding block;
   determining predictive actual weighting parameters of the block to be encoded corresponding to the forward encoding block and the backward encoding block according to the first weighting parameter, the second weighting parameter, the third weighting parameter and the fourth weighting parameter; and
   performing predictive encoding on the block to be encoded by the predictive actual weighting parameter;
   wherein, determining an overall brightness-based weighting parameter of a reference image comprises:
   determining the overall brightness-based weighting parameter of the reference image according to the image to be encoded and the reference image through minimal residual technique, comprising
   performing a down-sampling on the image to be encoded and the reference image;
   obtaining a weighted reference image with a brightness weighting parameter;
   dividing the down-sampled to-be-encoded image into blocks;
   obtaining a residual between each of the blocks with a matching block in the weighted reference image; and
   selecting, from brightness weighting parameters, one that produces a minimum sum of the squares of the obtained residuals as the brightness weighting parameter of the reference image.

2. The method according to claim 1, wherein the step of determining, for each block to be encoded, a forward encoding block and a backward encoding block corresponding to the block to be encoded comprises:
   determining, for each block to be encoded, a forward encoding block and a backward encoding block corresponding to the block to be encoded through motion search technique.

3. The method according to claim 1, wherein the step of determining a first weighting parameter corresponding to the forward encoding block comprises:
   calculating a predictive block corresponding to each preset forward weighting parameter according to the forward encoding block and the backward encoding block;
   calculating a residual value between the block to be encoded and each predictive block;
   determining a forward weighting parameter corresponding to a residual value having the smallest absolute value as the first weighting parameter.

4. The method according to claim 1, wherein the step of determining an overall brightness-based weighting parameter of a reference image comprises:
   determining the overall brightness-based weighting parameter of the reference image according to the brightness values of all the pixels and the total number of pixels of the reference image.

5. The method according to claim 4, wherein the reference image is a reference image containing the forward encoding block; the step of determining the overall brightness-based second weighting parameter of the reference image containing the forward encoding block comprises: determining the overall brightness-based second weighting parameter of the reference image containing the forward encoding block according to the brightness values of all the pixels and the total number of pixels of the reference image containing the forward encoding block;
   the reference image is a reference image containing the backward encoding block; the step of determining the overall brightness-based third weighting parameter of the reference image containing the backward encoding block comprises: determining the overall brightness-based third weighting parameter of the reference image containing the backward encoding block according to the brightness values of all the pixels and the total number of pixels of the reference image containing the backward encoding block.

6. The method according to claim 1, wherein the reference image is a reference image containing the forward encoding block; the step of determining the overall brightness-based second weighting parameter of the reference image containing the forward encoding block comprise: determining the overall brightness-based second weighting parameter of the reference image containing the forward encoding block according to the image to be encoded and the reference image containing the forward encoding block through minimal residual technique;

the reference image is a reference image containing the backward encoding block; the step of determining the overall brightness-based third weighting parameter of the reference image containing the backward encoding block comprises: determining the overall brightness-based third weighting parameter of the reference image containing the backward encoding block according to the image to be encoded and the reference image containing the backward encoding block through minimal residual technique.

7. An inter-frame predictive encoding device, wherein the device comprises a processor and a memory, the processor is configured to execute the following program modules stored in the memory:

a division module for dividing a frame to be encoded into a plurality of blocks to be encoded;

a first determination module for determining, for each block to be encoded, a forward encoding block and a backward encoding block corresponding to the block to be encoded;

a second determination module for determining a first weighting parameter corresponding to the forward encoding block;

a third determination module for determining an overall brightness-based second weighting parameter of a reference image containing the forward encoding block, and determining an overall brightness-based third weighting parameter of a reference image containing the backward encoding block;

a fourth determination module for determining a fourth weighting parameter corresponding to the backward encoding block according to the first weighting parameter and the following formula: fourth weighting parameter=1−first weighting parameter;

a fifth determination module for determining predictive actual weighting parameters of the block to be encoded corresponding to the forward encoding block and the backward encoding block according to the first weighting parameter, the second weighting parameter, the third weighting parameter and the fourth weighting parameter;

an encoding module for performing predictive encoding on the block to be encoded by the predictive actual weighting parameter;

wherein, the third determination module is further configured for:

performing a down-sampling on the image to be encoded and the reference image;

obtaining a weighted reference image with a brightness weighting parameter;

dividing the down-sampled to-be-encoded image into blocks;

obtaining a residual between each of the blocks with a matching block in the weighted reference image; and selecting, from brightness weighting parameters, one that produces a minimum sum of the squares of the obtained residuals as the brightness weighting parameter of the reference image.

8. The device according to claim 7, wherein the first determination module is specifically used for:

determining, for each block to be encoded, a forward encoding block and a backward encoding block corresponding to the block to be encoded through motion search technique.

9. The device according to claim 7, wherein the second determination module comprises: a first calculation sub-module, a second calculation sub-module, a determination sub-module;

the first calculation sub-module is used for calculating a predictive block corresponding to each preset forward weighting parameter according to the forward encoding block and the backward encoding block;

the second calculation sub-module is used for calculating a residual value between the block to be encoded and each predictive block;

the determination sub-module is used for determining a forward weighting parameter corresponding to a residual value having the smallest absolute value as the first weighting parameter.

10. An electronic device, wherein the electronic device comprises at least one processor and a memory;

the memory is used for storing computer programs;

the processor is used for performing the steps of the method of claim 1 when the programs stored on the memory are executed.

11. A computer-readable storage medium, wherein the computer-readable storage medium stores instructions that, when being executed on a computer, cause the computer to perform the steps of the method of claim 1.

* * * * *